Sept. 25, 1956 J. A. MAICKEL 2,764,106
TAMALE MAKING MACHINE
Filed Dec. 12, 1952 11 Sheets-Sheet 1

INVENTOR:
Joseph A. Maickel,

BY Pierce, Scheffler & Parker,
ATTORNEYS.

Sept. 25, 1956
J. A. MAICKEL
2,764,106
TAMALE MAKING MACHINE
Filed Dec. 12, 1952
11 Sheets-Sheet 2
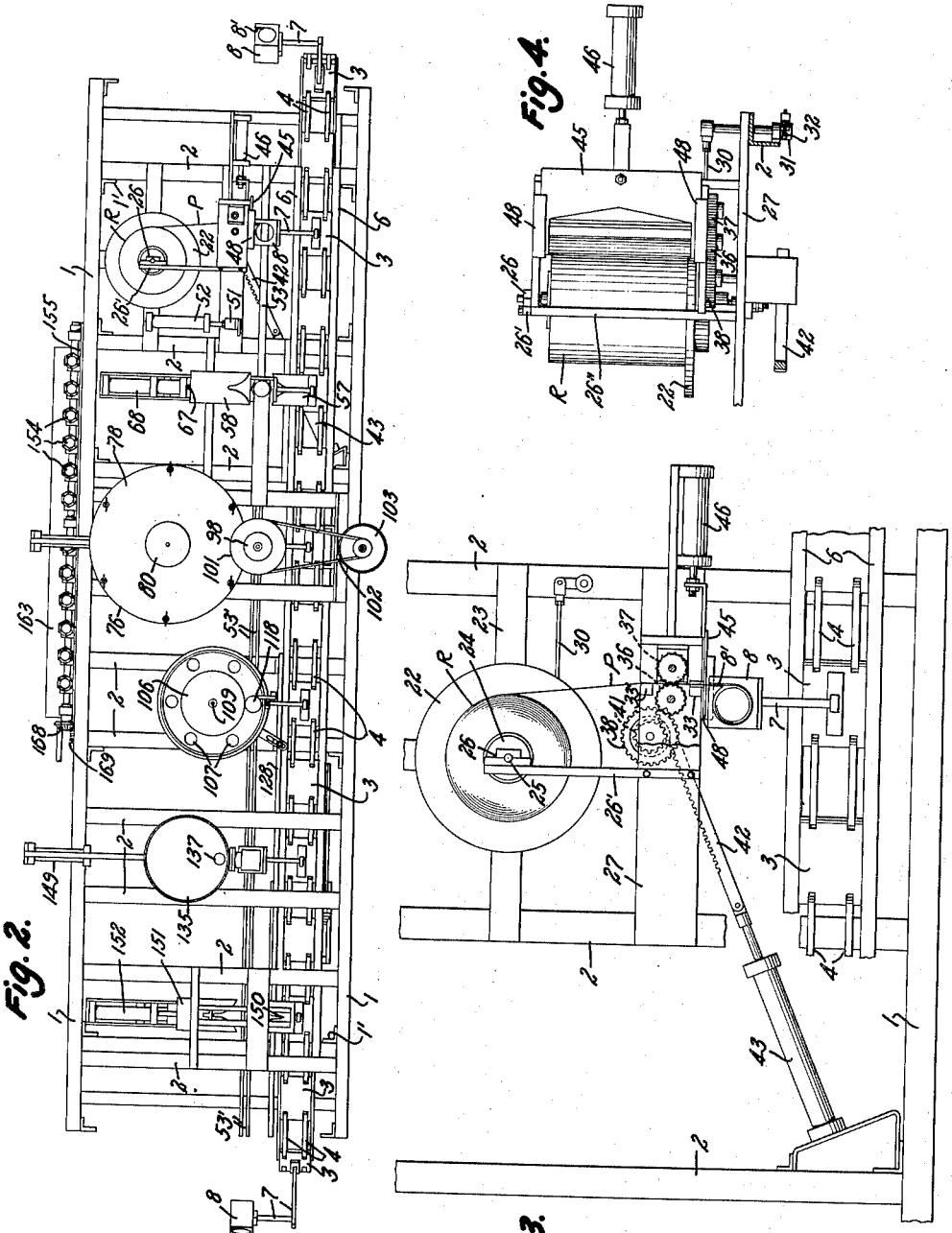
INVENTOR:
Joseph A. Maickel,
BY Pierce, Scheffler + Parker,
ATTORNEYS.

Sept. 25, 1956   J. A. MAICKEL   2,764,106
TAMALE MAKING MACHINE
Filed Dec. 12, 1952   11 Sheets-Sheet 3
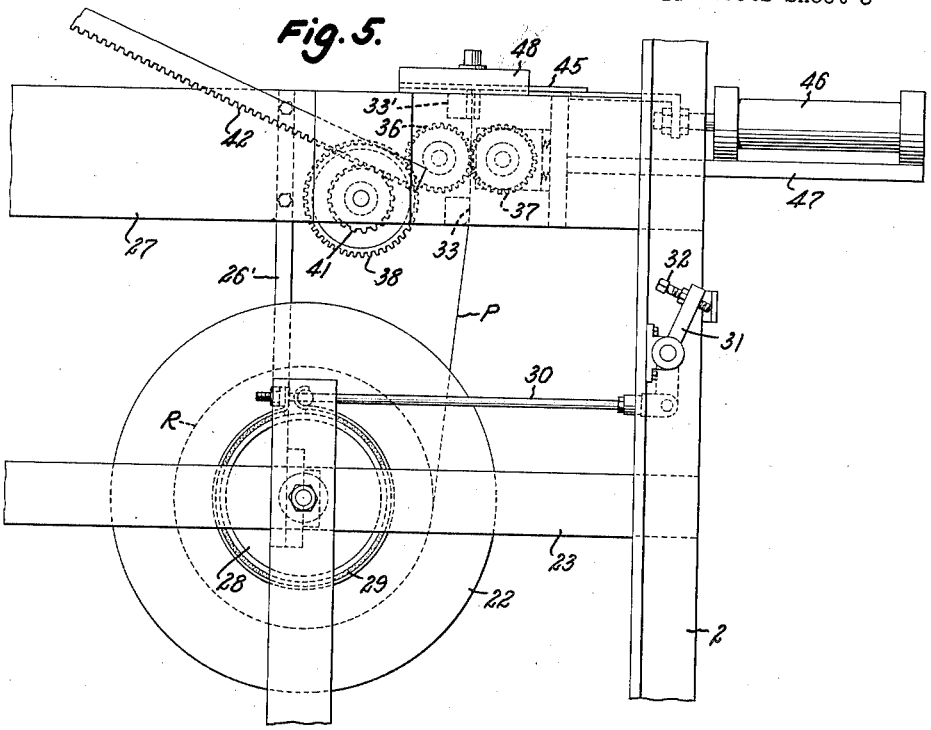
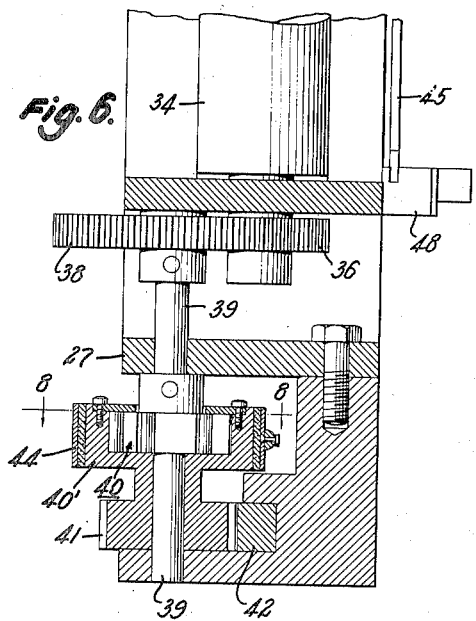
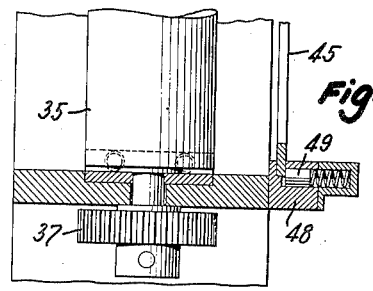
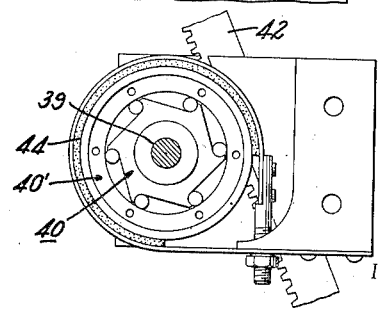
INVENTOR:
Joseph A. Maickel,
BY Pierce, Scheffler &Parker,
ATTORNEYS.

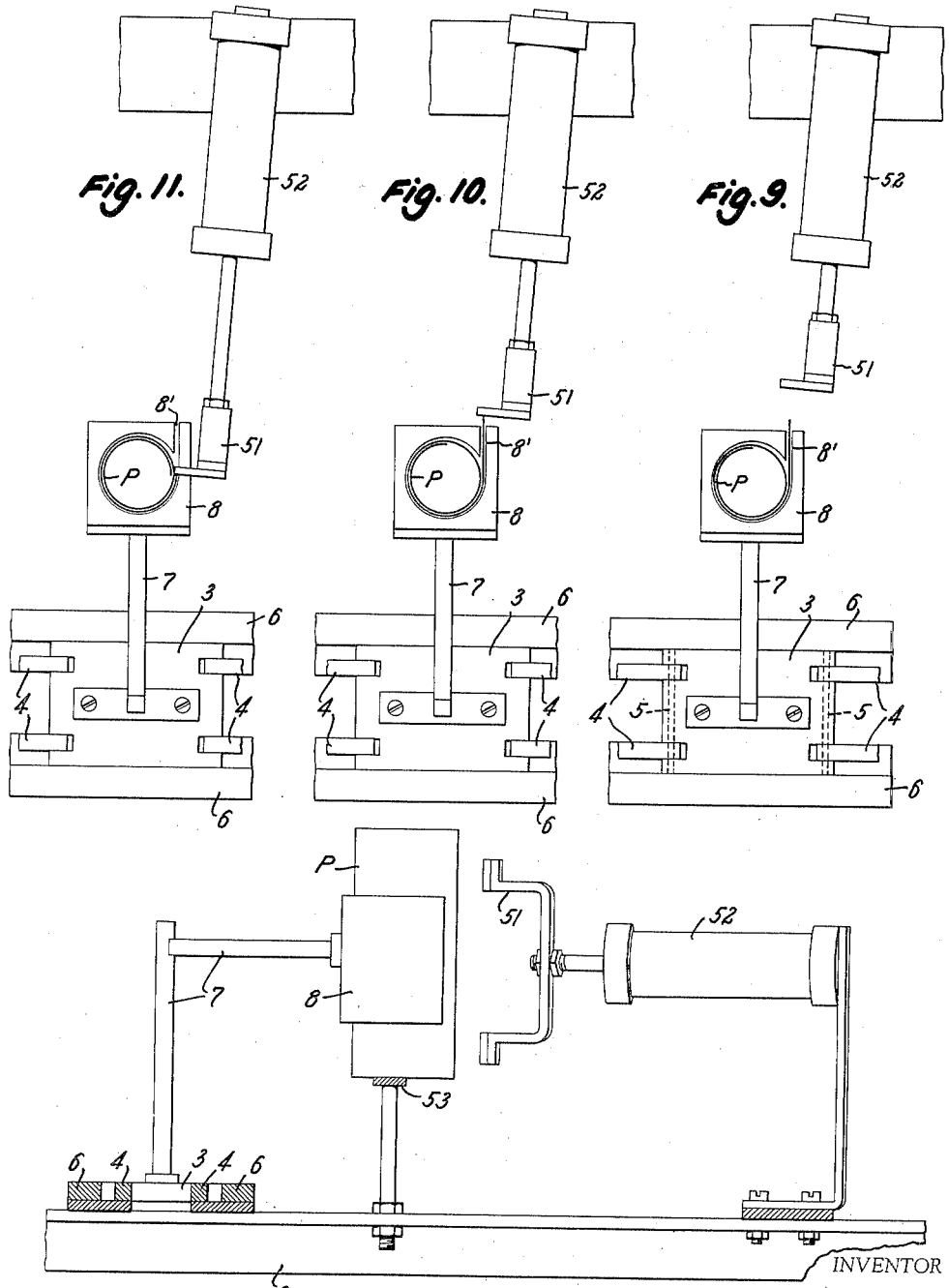

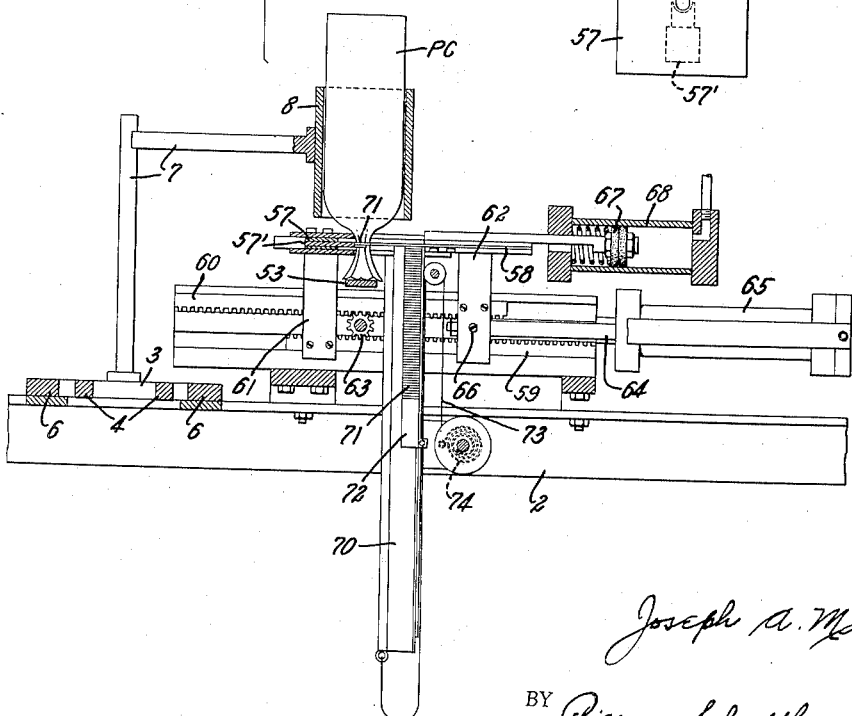

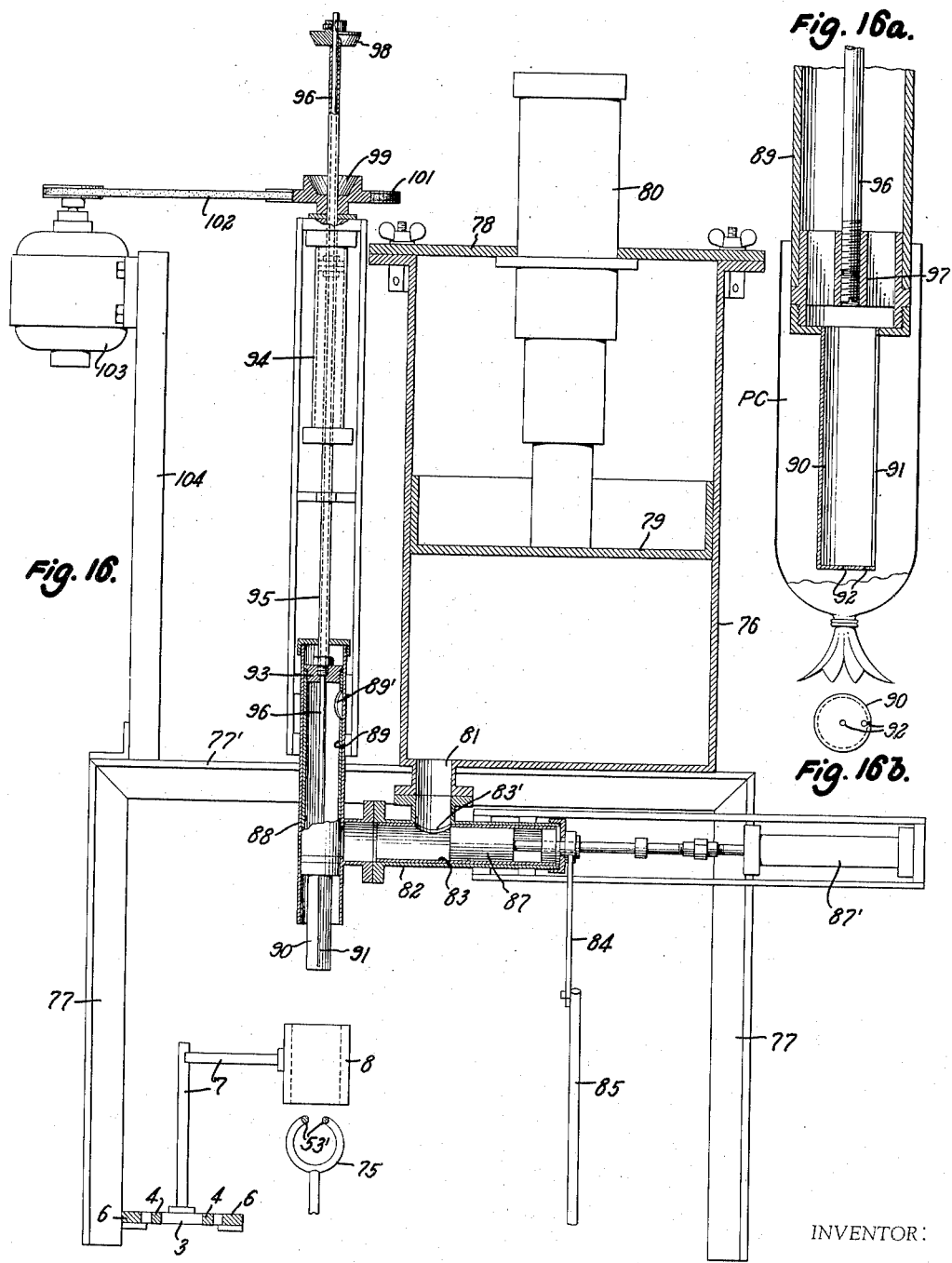

Sept. 25, 1956
J. A. MAICKEL
2,764,106
TAMALE MAKING MACHINE
Filed Dec. 12, 1952
11 Sheets-Sheet 7
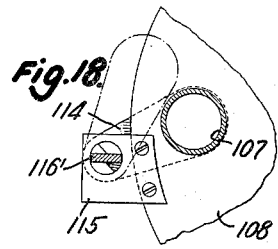
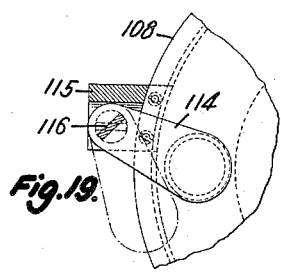
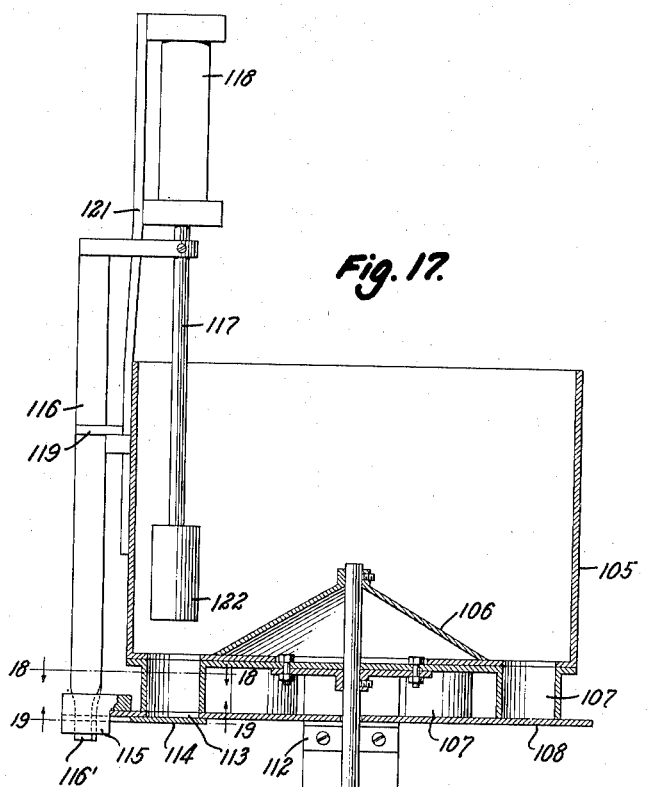
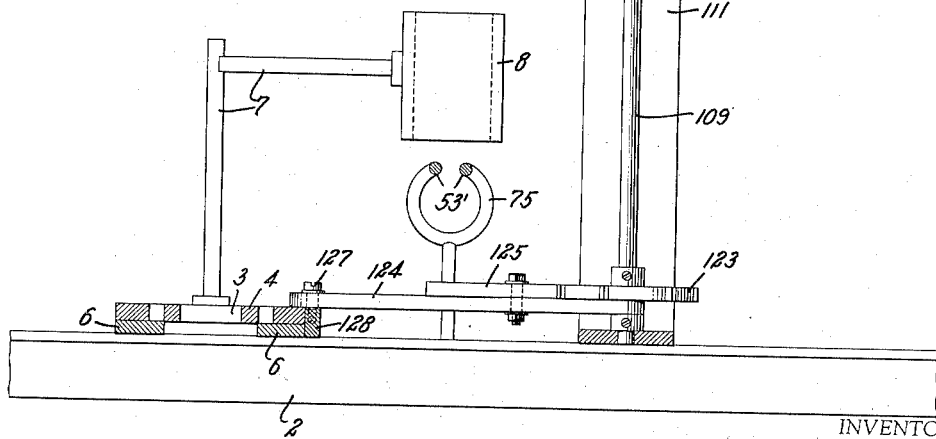
INVENTOR:
Joseph A. Maickel,
BY Pierce, Scheffler & Parker,
ATTORNEYS Sept. 25, 1956 J. A. MAICKEL 2,764,106
TAMALE MAKING MACHINE
Filed Dec. 12, 1952 11 Sheets-Sheet 8
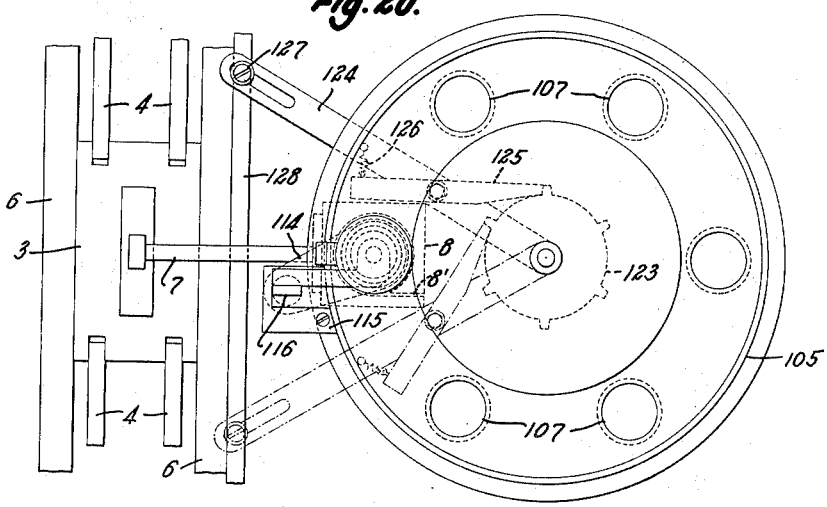
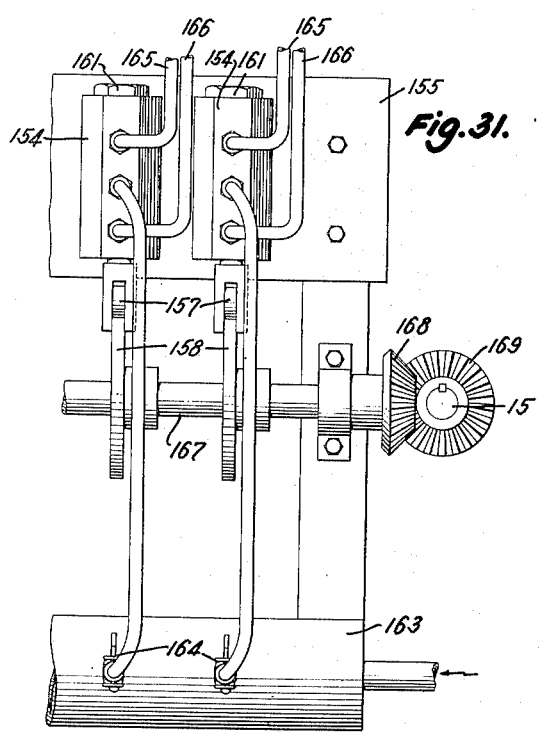
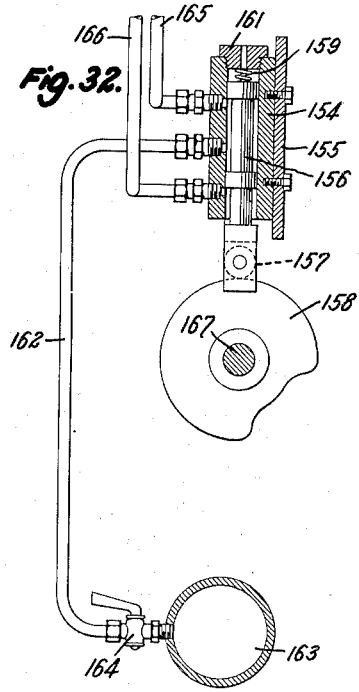
INVENTOR:
Joseph A. Maickel,
BY Pierce, Scheffler & Parker,
ATTORNEYS.

Sept. 25, 1956

J. A. MAICKEL 2,764,106

TAMALE MAKING MACHINE

Filed Dec. 12, 1952

INVENTOR:
Joseph A. Maickel,

BY Pierce, Scheffler & Parker,
ATTORNEYS.

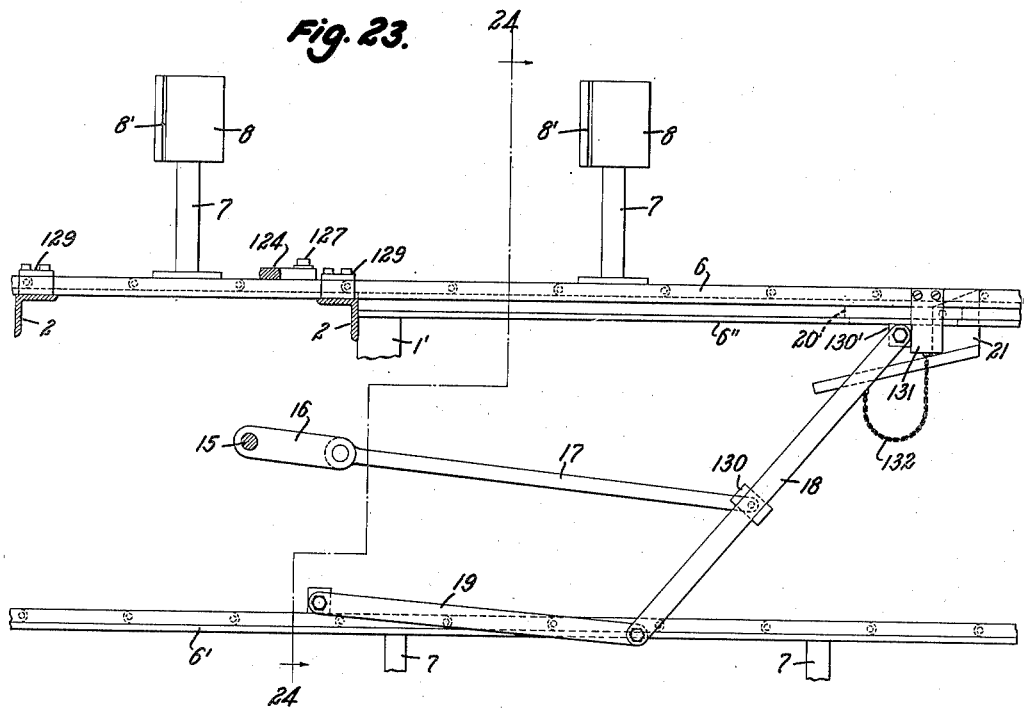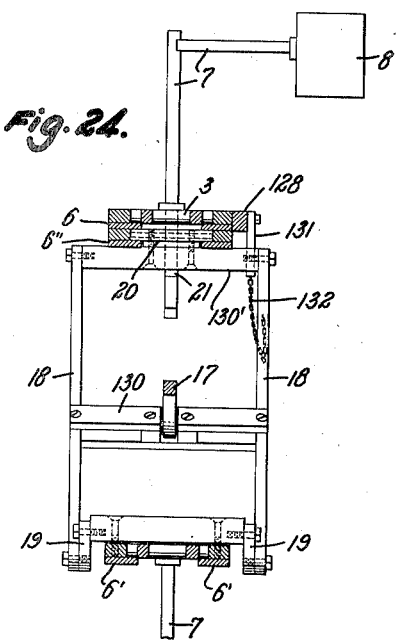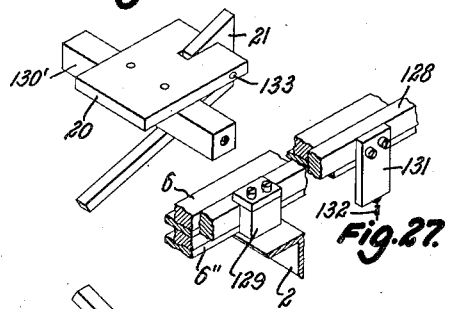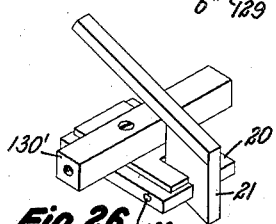

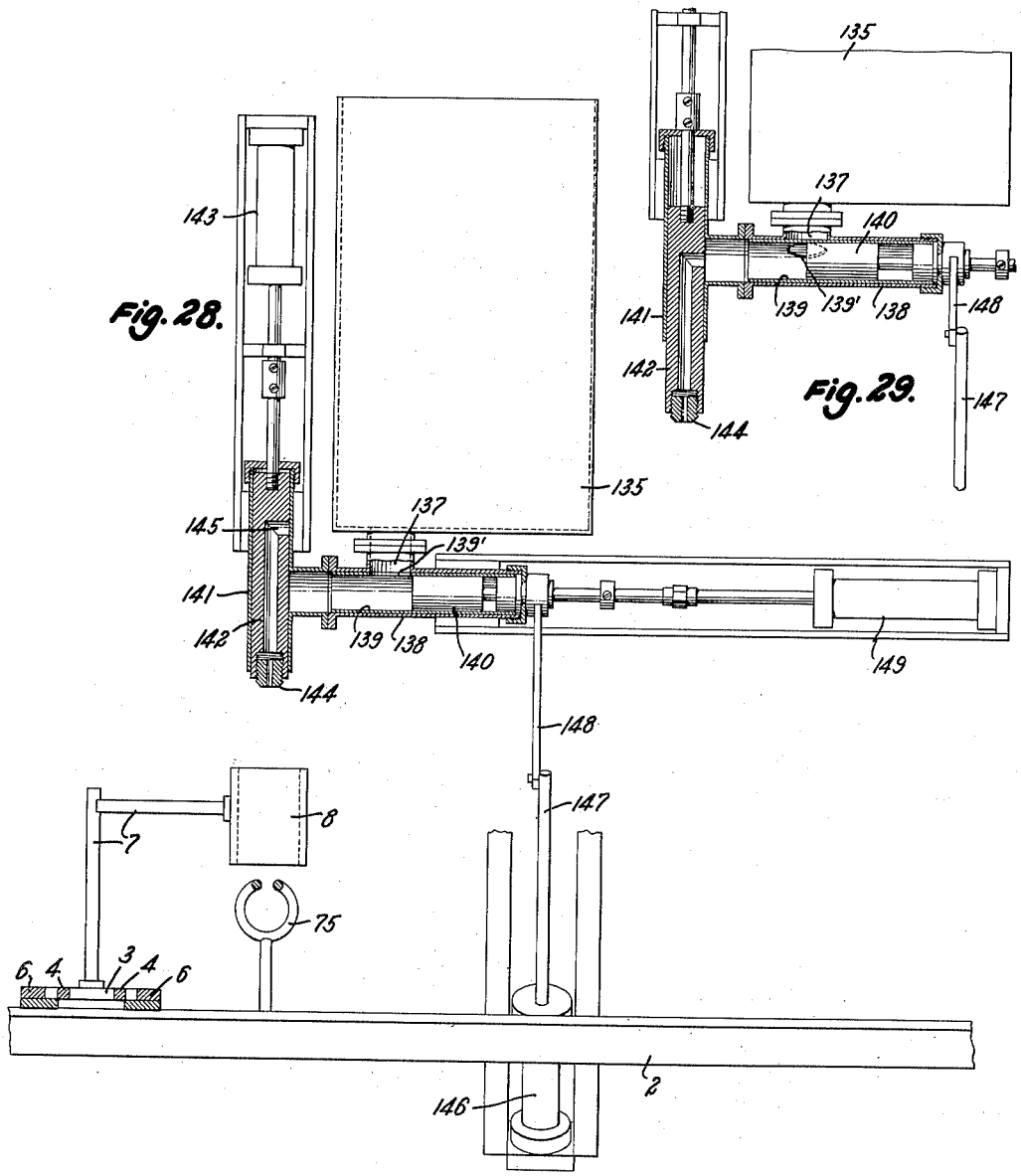

United States Patent Office 2,764,106
Patented Sept. 25, 1956

2,764,106

TAMALE MAKING MACHINE

Joseph A. Maickel, Butte, Mont., assignor of one-half to John Truzzolino, Butte, Mont.

Application December 12, 1952, Serial No. 325,620

4 Claims. (Cl. 107—1)

The present invention relates to a tamale making machine, and more particularly to a machine for combining the ingredients of tamales within wrappings in such manner as to simulate the hand-wrapped tamales.

Objects of the invention are to provide fully automatic machines for the manufacture of tamales of uniform size and composition from pre-cooked ingredients, i. e. corn meal or other cereal, meat, and gravy or sauce. Objects are to provide machines which include a number of stages or stations along which a step-by-step conveyor displaces a series of sleeves or holders in which paper containers for the tamales are placed or formed, the arrangement being such that different ingredients are introduced into the containers at successive stages or stations during intervals between the step-by-step advance of the conveyor, the containers being sealed at the final stage or station, and then discharged from the cups or holders. An object is to provide a tamale making machine in which a container, specifically a paper cylinder which is crimped and closed at its lower end, is moved step-by-step through stations at which, in succession, a layer of corn meal is applied to the container, a measured quantitl of cut or ground meat is introduced into the lined container, a measured quantity of gravy is introduced into the container, and the top of the container is then crimped and sealed. A further object is to provide an automatic tamale machine of the stated multiple station and step-by-step conveyor type in which the first stations of the machine comprise mechanisms for introducing paper into vertically arranged sleeves or holders of the conveyor to form open-ended cylinders, and then crimping and sealing the lower ends of such cylinders to form containers for receiving the tamale ingredients. More specifically, an object is to provide an automatic tamale machine of the stated characteristics in which the various mechanisms at the several stations of the apparatus are energized by power devices of air cylinder type which are synchronized for appropriately timed operation by valves actuated by cams on a shaft geared to a shaft which actuates the step-by-step conveyor.

These and other objects and the advantages of the invention will be apparent from the following specification when taken with the accompanying drawings in which:

Fig. 2 is a plan view of the machine;

Fig. 3 is a fragmentary plan view, on a larger scale, of the paper roll and associated mechanism for feeding a paper cylinder into a sleeve or holder of the conveyor;

Fig. 4 is a fragmentary front elevation, on the same enlarged scale, of the paper roll and the knife for severing the paper;

Fig. 5 is a bottom view, on a still larger scale, of the support for the paper roll, the paper feed mechanism and the cutting knife;

Figs. 6 and 7 are fragmentary vertical sections on the same scale as Fig. 5 of the paper feed mechanism;

Fig. 8 is a fragmentary horizontal section on line 8—8 of Fig. 6;

Figs. 9 to 11 are fragmentary plan views illustrating successive stages of the movement of the paper pushing mechanism which completes the introduction of the severed paper into the sleeve or holder of the conveyor;

Fig. 12 is a front elevation of the same with the pusher mechanism in the position illustrated in Fig. 9;

Fig. 13 is a vertical transverse section of the mechanism for crimping and sealing the lower end of the paper cylinder into which a tamale is to be introduced;

Figs. 14 and 15 are fragmentary plan views of the crimping and sealing mechanism in open and closed positions respectively;

Fig. 16 is a vertical transverse section, on a larger scale than that of Figs. 1 and 2, of the mechanism for lining the paper container with a layer of corn meal;

Fig. 16a is a fragmentary vertical section on a still larger scale showing the corn meal nozzle within a paper tamale container;

Fig. 16b is a bottom elevation of the corn meal nozzle;

Fig. 17 is a vertical transverse section, on the same scale as Fig. 16, of the mechanism for introducing a measured quantity of meat into the lined paper container;

Figure 21:
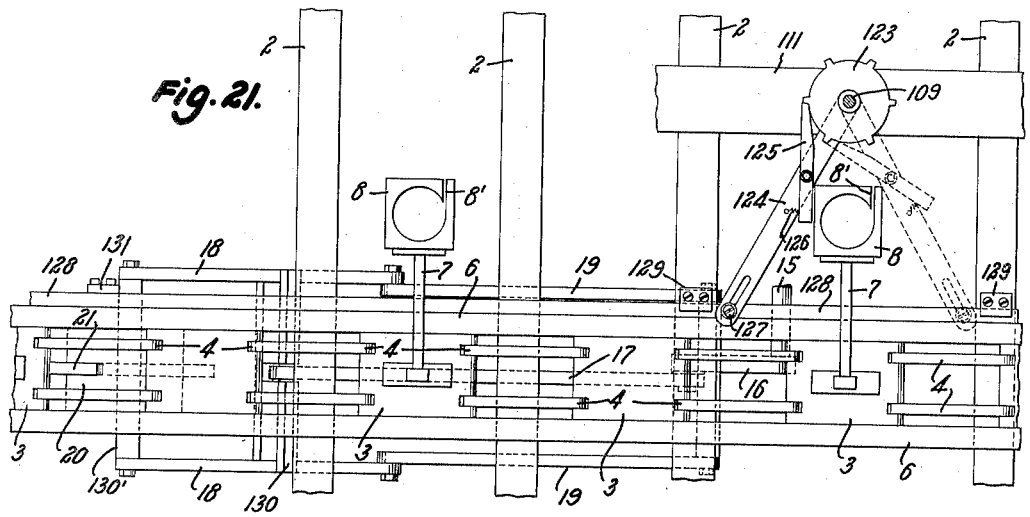
Figure 22:
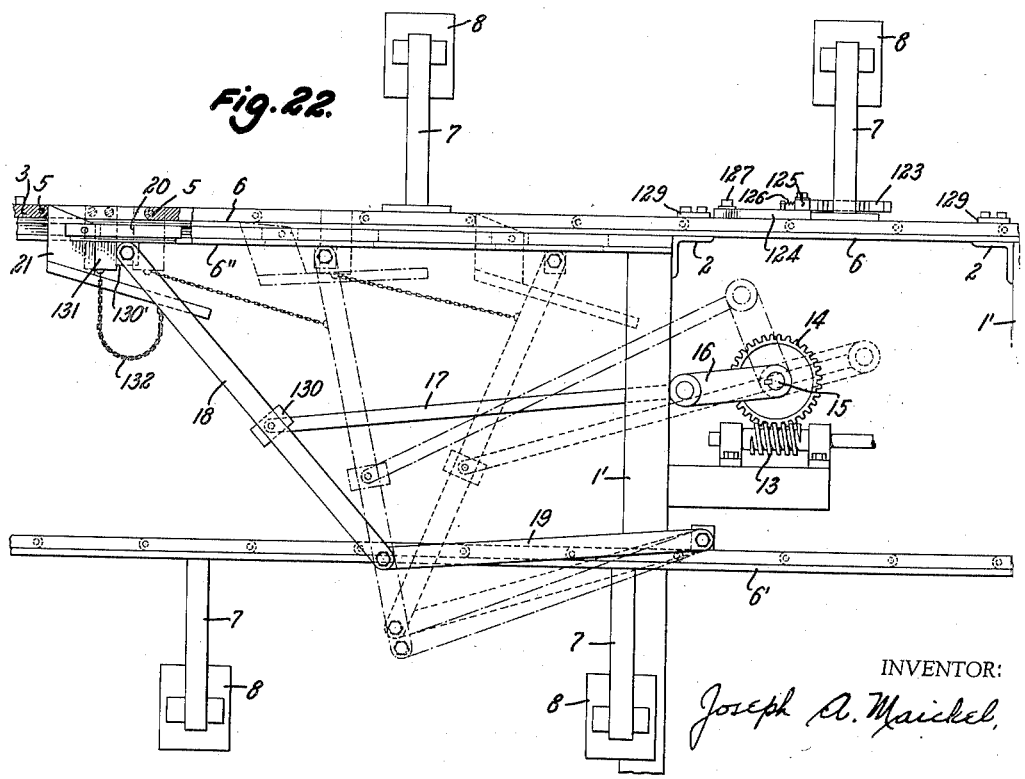

Figs. 18 and 19 are fragmentary horizontal sections on lines 18—18 and 19—19, respectively, of Fig. 17;

Fig. 20 is a fragmentary plan view of the meat hopper and associated apparatus as shown in Fig. 17;

Fig. 21 is a fragmentary plan view of the mechanism for imparting step-by-step advances to the meat hopper;

Fig. 22 is a fragmentary front elevation of the same, with parts shown in section;

Fig. 23 is a fragmentary vertical section, as seen from the rear of the machine, of the mechanism for advancing the conveyor and the meat container;

Fig. 24 is a transverse vertical section of the same as seen on the plane indicated by section line 24—24 of Fig. 23;

Figs. 25 and 26 are fragmentary perspective views of the conveyor advancing pawl and associated elements as seen from above and below, respectively;

Fig. 27 is a fragmentary perspective view of the slide for actuating the pawl and ratchet drive of the meat container, and showing the slide pawl which connects the slide to the conveyor-advancing mechanism;

Fig. 28 is a vertical transverse section of the apparatus for introducing gravy into the paper container;

Fig. 29 is a fragmentary view showing some elements of Fig. 28 in gravy-feeding position;

Fig. 30 is a fragmentary vertical transverse section of the mechanism for crimping and sealing the upper end of the tamale wrapper or paper container;

Fig. 31 is a fragmentary rear elevation of the cam-actuated valve system for controlling the operation of the several air cylinders of the machine; and Fig. 32 is a vertical section through the same.

The construction and method of operation of the apparatus can be best understood by first describing the general arrangement and the functions of the major elements of the complete apparatus.

Figure 1:
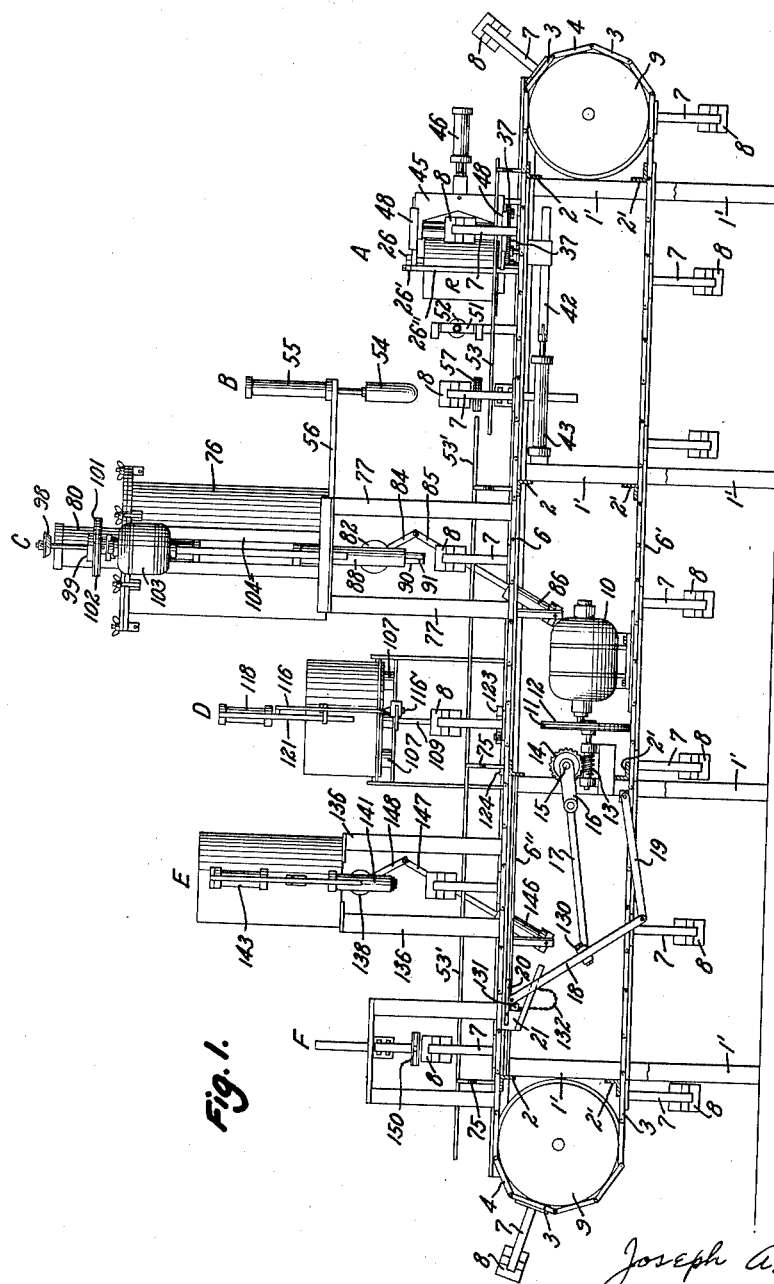
Fig. 1 is a front elevation of an automatic tamale making machine embodying the invention.

In Figs. 1 and 2 of the drawings, the reference characters A to F identify generically successive stations or major components of the apparatus at which wrappers for the tamales are progressively formed, filled and sealed. The wrappers or tamale containers are supported in sleeves or holders of an endless conveyor which is driven with a step-by-step motion in such manner that each holder is advanced from station to station by the successive step displacements of the conveyor. In the illustrated embodiment of the invention, the holders are open-ended vertically arranged sleeves and the sequence of operations at the several stations is as follows: Paper is fed into the holder at station A to form a multiple layer tubular liner for the holder, and the lower end of the paper tube is crimped and sealed at station B to form a cylindrical container for receiving the tamale ingredients. At station C, a measured quantity of corn meal is introduced into the paper container as a lining or coating on the bottom and the cylindrical wall of the container. A measured quantity of meat is introduced into the lined container at station D, and a measured quantity of gravy or sauce is introduced at station E. At station F, the top of the paper cylinder is crimped and sealed, and the completed tamale drops from the holder as it moves beyond the station F.

The conveyor and the equipment at the several stations are supported upon any suitable framing which, as shown, comprises rails 1, 1 supported on sets of legs 1' which are connected by upper and lower sets of crossbars 2, 2' respectively, the several members being of angle or other structural steel form.

The conveyor

The conveyor chain comprises a series of plates 3 and links 4 which are pivotally connected by pins 5, see Fig. 9, and the upper run of the conveyor is supported and guided by rails 6, 6 on the upper crossbars 2, 2 while the lower run is similarly supported by rails 6', 6' mounted on the lower crossbars 2', 2' of the frame. Alternate plates 3 of the conveyor chain are provided with angle brackets 7 which carry holders 8 in which the wrappings or containers for the tamales are to be formed or placed. The holders are of sleeve form as they have open-ended cylindrical bores therethrough which are vertically arranged when the holders are at the upper or operative run of the chain conveyor, and tangential entrance slots 8' extend from the central bore to the rear faces of the holders.

The conveyor chain passes around idler pulleys 9, 9 supported by means, not shown, at opposite ends of the frame, and the upper run is periodically advanced from right to left, as viewed in the drawings, by steps each equal to the spacing between two adjacent holders 8. A motor 10 is supported on the framing by means, not shown, and through a V-belt 11 and pulley 12 drives a worm 13 in mesh with a gear 14 on a shaft 15, Fig. 1. The linkage for driving the conveyor is shown in larger scale in Figs. 22 to 27 inclusive, but the general construction and method of operation will be apparent from Fig. 1. A crank arm 16 on shaft 15 is coupled by a link 17 to a frame having side bars 18 whose lower ends are pivoted on the framing by links 19 and whose upper ends are pivoted to a slide 20 which moves along and is guided by the rails 6, 6 of the upper conveyor track. A pawl 21 is pivoted on the slide 20 to engage, and to displace towards the left, a plate 3 of the conveyor chain upon counterclockwise movement of the bars 18 by the crank arm 16. On reverse movement of the crank arm, the pawl 21 tilts to move idly towards the right without imparting movement to the conveyor chain.

Station A—Paper tube forming

The equipment at station A of the apparatus is illustrated in detail in Figs. 3 to 8 inclusive. A disk or plate 22 for supporting a roll R of paper P is rotatably mounted upon a strap 23 secured between adjacent crossbars 2, 2, and is provided with an axial sleeve 24 terminating in a shaft 25 which has its lower end journalled in the strap 23. The upper end of the shaft 25 is journalled in a bearing 26 carried by a supporting arm 26' which is detachably mounted on a standard 26" extending vertically upward from another cross strap 27, which is supported upon the crossbars 2, 2. A tensioning drum 28 on and beneath the disk 22 is engaged by a friction band 29 which is adjustable through link 30 and bell-crank lever 31 on crossbar 2 and a screw 32.

The paper strip P from the roll R passes over a guide 33 on the strap 27, between feed rolls 34, 35 with meshing drive gears 36, 37 respectively, and further guides 33' to enter the slot 8' of the holder 8 at station A, as shown in Fig. 3. Gear 36 of feed roll 34 meshes with and is driven by a gear 38 on shaft 39 which is connected by a one-way clutch 40 to a gear 41 that is driven by a rack 42 actuated by an air cylinder 43. Reverse movement of the drive gear 41 and the cup element 40' of the clutch is prevented by a friction brake 44 which engages the element 40'.

A knife 45 for severing the paper strip P is actuated by an air cylinder 46 mounted upon a bracket 47, the knife being supported in guides 48 and constrained to linear movement by spring pressed plungers 49. The length of the paper strip P which is severed by the knife 45 is sufficient to form two complete turns within a holder 8, but the severed end is initially outside of the holder 8, see Fig. 9. During the step advance of the holder 8 from station A to station B, a U-shaped pusher arm 51 is actuated by its air cylinder 52 to engage the paper strip above and below the holder and complete the entry of the strip into the cylindrical bore of the holder, Figs. 9 to 12. The lower end of the paper strip or tube is supported by a rail 53 during its introduction into the holder and transport to station B.

Station B—Container forming

The mechanism for crimping and sealing the lower end of the paper tube to form a paper cup or container PC for the tamale is shown in detail in Figs. 13 to 15, and is of known type for crimping a tube and applying a sealing ring of wire.

A cylindrical former or mandrel 54 with a rounded nose is depressed by an air cylinder 55 to enter the paper tube and prevent collapse of the same during the crimping operation, the cylinder being mounted upon a bar 56 secured to the framing of the station C equipment. Opposed crimping jaws 57, 58 are supported from racks 59, 60 by struts 61, 62 respectively for movement in a horizontal plane at a desired distance above the guide rail 53 and the lower end of the paper tube. The racks mesh with an idler gear 63 and therefore are moved in opposite directions by the piston rod 64 of the air cylinder 65, the piston rod being connected to one of the struts, for example struts 62, by a pin 66. The crimping jaw 57 is of laminated construction and includes an anvil 57' between two outer plates, and the crimping jaw 58 is similarly laminated and includes a hammer 58' slidable between two outer plates and secured to the piston 67 of an air cylinder 68 which is supported upon the jaw 58 by a strap 69. A magazine 70 for U-shaped wire staples 71 is secured to the supporting frame by means, not shown, and a carrier 72 for the staples is secured to a band or wire 73 that is tensioned by a coiled spring 74.

Air is supplied to the cylinders 55, 65 and 68 in timed sequence to introduce the former 54 into the paper tube, to close the crimping jaws, to set or crimp a staple 71 about the bunched end of the paper tube, and the pressure air is then exhausted from the cylinders simultaneously or in the reverse order.

On movement of the paper container PC beyond station B, it is guided and supported by a pair of parallel guide rails or bars 53' that are mounted upon the frame structure by yokes 75.

Station C—Lining container with corn meal

The apparatus of station C for introducing the cooked corn meal or other cereal into the containers PC is shown on an enlarged scale in Fig. 16. A tank 76 for the cooked meal is supported upon the main framework by a frame or skeleton support comprising uprights 77 and cross members 77'. The tank has a removable cover 78, and pressure is applied to the material in the tank 76 by a piston 79 and air cylinder 80 which are mounted on the cover, and measured charges of corn meal are discharged through the outlet pipe 81 under the control of a rotary sleeve valve and feed pump. The outlet pipe 81 opens into the feed pump cylinder 82, and the rotary valve 83 is a sleeve or lining within the cylinder 82 and has a port 83' which alines with the outlet pipe, as shown in Fig. 16, at the beginning and at the end of the operation of the apparatus. The valve 83 is provided with a crank arm 84 connected to the piston rod 85 of air cylinder 86, see Fig. 1, for rocking the valve to move its port 83' out of alinement with the outlet pipe 81 of the supply tank 76. The plunger 87 of the feed pump is slidable in the rotary valve 83 and actuated by an air cylinder 87' in timed relation to the movement of the rotary valve.

The pump cylinder 82 mechanically supports and opens into a transfer cylinder 88 in which a hollow feed nozzle is supported for sliding and rotary movement. The upper tubular portion 89 of the assembly has a sliding fit in cylinder 88 and is provided with a port 89' which alines with the feed pump cylinder 82 when the assembly is in lowermost position, and the lower tubular portion 90 of the nozzle assembly is of lesser diameter and coaxial with the upper portion 89. The lower portion 90 constitutes the nozzle element per se, and it has a longitudinal slot 91 along its entire length and closed at its lower end and except for a pair of small outlet openings 92. The upper end of the tube 89 is closed by a head 93 which is connected to the piston of an air cylinder 94 by a hollow piston rod 95 which extends through and projects above the air cylinder 94. A shaft 96 is journalled in the hollow piston rod 95 and has its lower end threaded into a spider or apertured washer 97 to which the nozzle 90 is secured. The shaft 96 extends above the air cylinder 94 and has a conical clutch element 98 fixed thereto in such position as to engage a cooperating conical clutch element 99 when the nozzle assembly is in lowermost position. Clutch element 99 is carried by a pulley 101 which is journalled on the hollow piston rod 95 and continuously rotated by a belt 102 and a motor 103 that is supported on posts 104. The hollow piston rod 95 is splined or otherwise prevented from rotation by any convenient means, not shown, since the upper tubular portion 89 of the corn meal nozzle assembly must be restricted to a rectilinear sliding motion to bring its inlet portion 89' into alinement with the feed cylinder 82 when the nozzle assembly is moved into lowermost position by the air cylinder 94.

On arrival of an empty container PC at station C, pressure air is introduced into cylinder 86 to close the rotary valve 83 and into cylinder 94 to lower the feed nozzle assembly to aline the port 89' of the nozzle assembly with the feed cylinder 82. The clutch 98, 99 is engaged when the nozzle assembly reaches this position and pressure air is then introduced into the cylinder 87' to force a measured charge of corn meal into the container PC. The corn meal is thrown outwardly and compacted by the rotating nozzle 90 to form a relatively firm lining of uniform density and thickness within the container PC. Pressure air is then released in sequence from cylinders 94, 86 and 87' to lift the nozzle assembly, open the rotary valve 83, and withdraw the feed pump plunger 87 to draw a new charge of corn meal from the tank 76. The lined container may now be moved to the next station for the introduction of the cooked meat.

*Station D—Feeding meat into the lined container*

The equipment at station D is shown in Figs 17 to 27 inclusive.

The container for the cooked meat, ground or cut to desired size, is a tank 105 having a conical bottom 106 at its central portion for directing the fluent material into the cylindrical open-ended measuring cups 107 which are uniformly spaced around the peripheral portion of the bottom wall of the tank and are normally closed at their lower ends by engagement wtih a horizontal plate 108. The meat tank is supported by a shaft 109 which is journalled in a frame 111 supported upon one or more of the crossbars 2 of the main frame. The bottom plate 108 is secured to the frame 11 by angle brackets 112 and has a circular discharge port 113 in vertical alinement with the rest position of a container holder 8 between step advances of the conveyor. The outer end of a valve plate 114 for controlling the discharge port 113 is located in a slot in a bracket 115 and has a transverse slot for receiving the valve-operating strip 116 which is secured to the piston rod 117 of an air cylinder 118 and extends through a slotted guide 119 mounted upon the strap 121 which supports the air cylinder on the tank 105. The lower end 116' of the valve operating strip 116 is twisted through 45° and turns the valve plate through the angle to clear the discharge port before the feed plunger 122 on the piston rod 117 moves into the measuring cup 107 then alined with port 113 to discharge its contents into the container in the associated holder 8.

To advance the tank 105 step-by-step to move a filled measuring cup 107 into line with the discharge port 113 of the plate 108, a ratchet wheel 123 with teeth of the same number as the measuring cups 107, which is six as illustrated, is fixed to the shaft 109. A lever 124 is journalled on shaft 109 and carries a pawl 125 which is yieldingly urged into engagement with the ratchet teeth by a spring 126. The outer end of the lever 124 is slotted to receive a pin or stud 127 fixed in a slide 128 that is reciprocated by the linkage which imparts a step-by-step advance to the conveyor. The slide is guided by brackets 129 secured to crossbars 2 of the machine framing.

As shown in Figs. 24 to 26, the bars 18 are connected by cross members 130 and 130', the lever 17 being pivotally connected to the cross member 130 and the slide 20 being secured to the cross member 130' and guided for reciprocation by the rails 6 and lower rails 6". The slide 128 has a pawl or lug 131 secured thereto which projects into the path of the cross member 130' and is moved thereby towards the left, Figs. 2, 21 and 22, on a step advance of the conveyor, thereby moving the lever 124 into the full line positions shown in Figs. 20 and 21. The slide pawl or lug 131 is connected to the rear link 18 by a chain or other flexible connection 132 and clockwise movement of the links 18 in the intervals between step advances of the conveyor therefor shifts the slide 128 towards the right to move the lever 124 into the dotted line positions shown in Figs. 20 and 21. The meat container 105 is thus advanced one step, simultaneously with a step advance of the conveyor, to bring a filled cup 107 into vertical alinement with the dwell position of a tamale container which was lined with corn meal at the preceding stage of the machine.

As shown in Figs. 25 and 26, the pawl 21 of the conveyor advancing mechanism is pivotally supported by a pin 133 on the slide 20 which is secured to the cross member 130'.

*Station E—Introduction of gravy*

The equipment at station E is illustrated in Figs. 28 and 29, and is similar to but simpler than that of station C.

A tank 135 for gravy is supported by posts 136, see Fig. 1, from the main frame and has an outlet pipe or port 137 opening into the casing 138 of a combined valve and pump. A rotary sleeve valve 139 with a port 139' is journalled in the casing 138 and constitutes the cylinder for a feed plunger 140. The casing 138 supports and opens into a cylinder 141 in which a feed nozzle 142 may be reciprocated by an air cylinder 143. The nozzle 142 has a bore therethrough which extends upwardly from a removable outlet member 144 to a port or inlet 145 which alines with the feed pump 138 when the nozzle is in lowermost position. The rotary valve 139 is actuated by an air cylinder 146, through piston rod 147 and crank arm 148, to close the gravy tank outlet 137 before the pump plunger 140 is displaced by its air cylinder 149 to discharge a measured charge of gravity into the tamale container. On release of pressure air from cylinder 143 to lift the feed nozzle, air is released from cylinder 146 to open the rotary valve 139, and air is then released from cylinder 149 to withdraw the feed pump plunger 140 and draw a fresh charge of gravy into the casing 138.

*Station F—Container closing*

The apparatus at station F for closing the top of the filled container PC, as shown in Fig. 30, may be, and preferably is, an inversion of the crimping and stapling apparatus shown in detail in Figs. 13 to 15. The opposed means" as employed to identify an air cylinder is to be understood as of broad scope and including motor or power means of electromagnetic type.

The full advantages of automatic operation are attained with the described apparatus which includes the station A for withdrawing paper from a roll and inserting it in holders 8 as a paper tube, and the station B for closing the lower end of the tube to form a container for a tamale, but it is apparent that the equipment at the following stations could be employed to fill and close containers of paper or plastic material which are inserted in the holders 8 in advance of the station C or which are formed at station B by crimping staples upon the lower ends of preformed tubes of

UNITED STATES PATENTS

| | | | |
|---|---|---|---|
| 835,756 | Hutchison | Nov. 13, | 1906 |
| 956,167 | Pollard | Apr. 26, | 1910 |
| 1,719,931 | Hall | July 9, | 1929 |
| 1,792,203 | Wakefield | Feb. 10, | 1931 |
| 2,009,416 | Schilder | July 30, | 1935 |
| 2,044,748 | Peterson | July 16, | 1936 |
| 2,280,324 | Tracy | Apr. 21, | 1942 |
| 2,303,351 | Gage | Dec. 1, | 1942 |
| 2,343,599 | Walter | Mar. 7, | 1944 |
| 2,379,407 | Angell | July 3, | 1945 |